ns
3,159,853
SWING WHEELS FOR CAR TOP BOATS
John L. Chesack, 1817 McKeon Road, Kenosha, Wis.
Filed Dec. 7, 1962, Ser. No. 242,993
5 Claims. (Cl. 9—1)

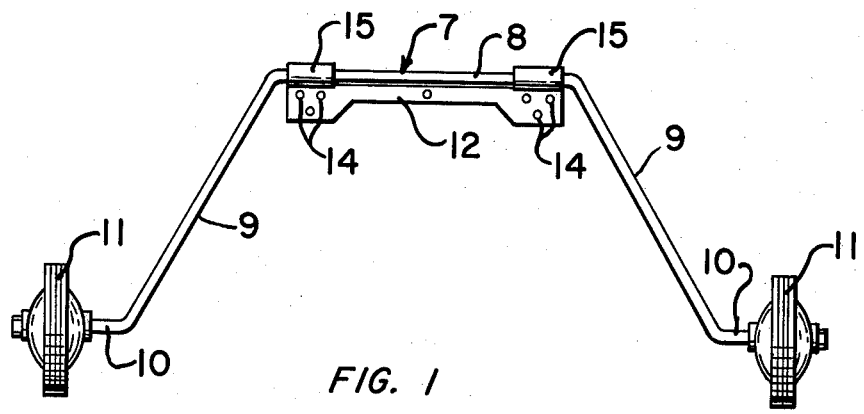
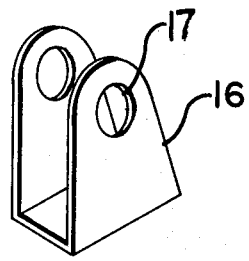
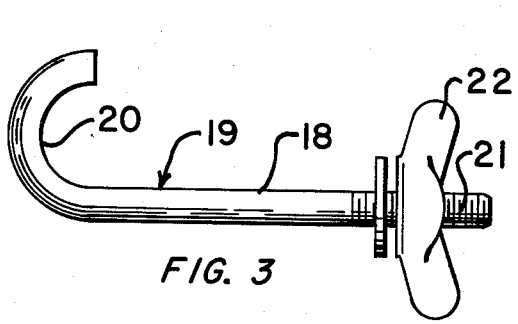
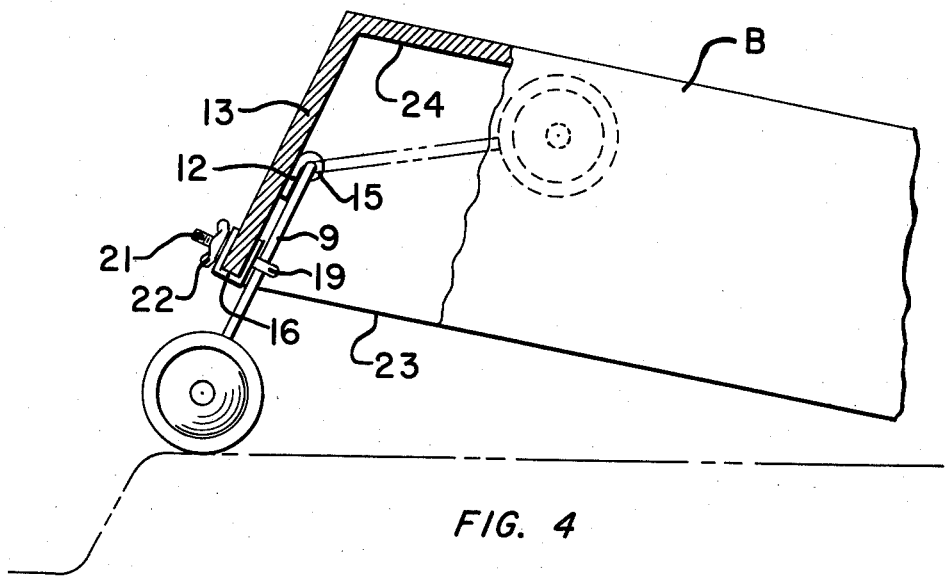

This invention relates to small boats that are carried in an inverted position on the top of an automobile.

Sportsmen the world over have long wanted some practical means of loading and unloading a small boat from the top of their automobile. This desire is particularly true when the boat is to be hoisted on top of a car by one man.

It is, therefore, an object of this invention to provide swing wheels for car top boats that will permit one man to easily and quickly unload and load a boat from the top of a car without any additional help.

Another object of this invention is to provide swing wheels for car top boats that can be swung into the boat when not in actual use.

Another object of this invention is to provide swing wheels for car top boats that can readily be mounted in in any boat by any mechanically minded person and in a minimum of time and with a minimum of tools.

Another object of this invention is to provide swing wheels for car top boats that do not add any objectionable weight to the boat.

Another object of this invention is to provide swing wheels for car top boats that make it possible for one to leave their car on the highway and then roll the boat to or from the water's edge by means of the herein described wheels.

Still another object of this invention is to provide swing wheels for car top boats, the mechanism of which is fool proof in operation, and will, therefore, not fail and cause injury during the loading and unloading of the boat from the top of a car.

Other and further objects and advantages of this swing wheels for car top boats will be hereinafter described, and the novel features thereof defined in the appended claims.

Referring to the drawing:

FIGURE 1 is a front view of this invention ready for mounting on a boat.

FIGURE 2 is a pictorial view of one of the mounting brackets for this invention.

FIGURE 3 is a pictorial view of one of the hook bolts used in securing this invention in place when the boat, to which it is attached, is to be taken on or off a car top.

FIGURE 4 is a side view of this invention attached to a boat on top of a car which is shown in part in phantom lines.

Similar reference characters refer to similar parts throughout the several views of the drawing.

Having reference now to the drawing in detail, there is generally indicated by the character 7 an axle having the basic configuration of a capital letter V and embodying a horizontally disposed center section 8 having each end terminate in a horizontal stub axle 10, as clearly shown in FIGURE 1 of the appended drawing. A free turning wheel 11 is suitably secured on each stub axle 10, in order that the wheel will not come off the end of the axle. An axle supporting member 12 is mounted on transom 13 by means of a plurality of wood screws 14. The aforesaid axle supporting member 12 embodies a flat piece of steel or any other desired metal having each end 15 rolled around the aforesaid outer ends of the already mentioned horizontally disposed center section 8, as best shown in FIGURE 1 of the drawing.

A pair of brackets 16, that are U-shaped when viewed from either end and basically V-shaped when viewed from the front or back, are provided with in line openings 17 through which is placed the shank 18 of the hook bolt 19 which embodies the aforesaid shank 18, which has one end terminating in a U-shaped hook 20, and the other end terminating in a threaded portion 21 on which is screwed a wing nut 22.

The way in which this novel invention of swing wheels for car top boats is used, is clearly shown in FIGURE 4 of the appended drawing, where it is seen that the boat having the invention secured to its transom, as previously described, has its two hook bolts 19 loosened by backing up on the wing nuts 22 and then turning the hook bolts so that their U-shaped hook 19 encircles the member 9 which is swung downward, so that the wheels 10 are below the gunwale 23 of the boat, which is herein characterized for the first time by the reference letter "B." The boat is now easily turned upside down and rolled onto (or off) the top of any automobile, which is shown in part in phantom lines in the aforesaid FIGURE 4 of the appended drawing. When the boat "B" is in use, the wheels 11 are swung back, so that the wheels rest on the bottom 24 of the boat, as is clearly shown in the already mentioned FIGURE 4.

From the foregoing it will now be seen that there is herein provided swing wheels for car top boats which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

In accordance with the provisions of the United States patent statutes, as stated in the United States Code Title 35, Patents, I have now described the principle of construction and operation of my invention of a swing wheels for car top boats in the form which I personally consider the best embodiment thereof, and what I now claim as my invention and desire to secure by Letters Patent is:

1. An invention of the character described, comprising, a boat hull having a transom with an inner surface and an outer surface, a pair of wheels spaced slightly less than the width of the inner suface of said transom, a stub axle for each wheel, each wheel rotatably secured to its axle, a support member rigidly secured to both stub axles, means swingably securing the support member to the inside surface of said transom whereby the support member can be swung to a position with the wheels within the boat or to a second position with the support member extending along the inner surface of the transom, the support member being dimensioned so that the wheels are beyond the transom when the support member is in the said second position, and means for temporarily securing the support member and wheels in said second position.

2. An invention of the character described, comprising, a car top boat having a transom with an inner surface and an outer surface, a pair of wheels, an axle embodying a horizontal central section, end sections extending away from said central section and diverging, each end section terminating in a horizontally disposed stub axle, one of said wheels rotatably secured on each stub axle, the wheels spaced slightly less than the width of the inner surface of the transom, an axle support member swingably securing the said axle to the inside surface of the transom whereby the axle can be swung to a possition with the wheels within the boat or swung to a second position with the diverging portions extending along the inner surface of the transom and said wheels extending beyond said transom, and means to temporarily secure said axle in said second position.

3. An invention of the character described, comprising, a car top boat having a transom with an inner surface and an outer surface, a pair of wheels, an axle embodying a horizontal central section, end sections extending away from said central section and diverging, each end section terminating in a horizontally disposed stub axle, one of said wheels rotatably secured on each stub axle, the wheels spaced slightly less than the width of the inner surface of the transom, an axle support member swingably securing the said axle to the inside surface of the transom whereby the axle can be swung to a position with the wheels within the boat or swung to a second position with the diverging portions extending along the inner surface of the transom and said wheels extending beyond said transom, a pair of brackets which have the configuration of a letter U when viewed from either end, the brackets fitting over the edge of the transom, the brackets and transom having aligned openings, and bolt means extending through said openings for temporarily securing said axle in said second position.

4. An invention of the character described, comprising, a car top boat having a transom with an inner surface and an outer surface, a pair of wheels, an axle embodying a horizontal central section, end sections extending away from said central section and diverging, each end section terminating in a horizontally disposed stub axle, one of said wheels rotatably secured on each stub axle, the wheels spaced slightly less than the width of the inner surface of the transom, an axle support member swingably securing the said axle to the inside surface of the transom whereby the axle can be swung to a position with the wheels within the boat or swung to a second position with the diverging portions extending along the inner surface of the transom and said wheels extending beyond said transom, a pair of brackets which have the configuration of a letter U when viewed from either end, the brackets fitting over the edge of the transom, the brackets and transom having aligned openings, and hook shaped bolts passing through said openings to temporarily secure the axle in said second position.

5. An inveniton of the character described, comprising, a car top boat having a transom with an inner surface and an outer surface, a pair of wheels, an axle embodying a horizontal central section, end sections extending away from said central section and diverging, each end section terminating in a horizontally disposed stub axle, one of said wheels rotatably secured on each stub axle, the wheels spaced slightly less than the width of the inner surface of the transom, an axle support member having each end rolled around the said horizontal center section of the said axle, means securing the said axle support member to the inside of the transom of the car top boat whereby the axle can be swung to a position with the wheels within the boat or swung to a second position with the diverging portions extending along the inner surface of the transom and said wheels extending beyond said transom, and means to temporarily secure said axle in said second position.

References Cited in the file of this patent
UNITED STATES PATENTS

| | | |
|---|---|---|
| 1,693,633 | Allen | Dec. 4, 1928 |
| 1,939,863 | Seiter | Dec. 19, 1933 |
| 2,395,717 | Bjork | Feb. 26, 1946 |
| 2,548,274 | Van Oeveren | Apr. 10, 1951 |
| 2,624,591 | Choplin | Jan. 6, 1953 |
| 2,891,800 | Starks | June 23, 1959 |
| 2,916,747 | Parrott | Dec. 15, 1959 |